United States Patent
Jones et al.

(10) Patent No.: US 7,562,670 B1
(45) Date of Patent: Jul. 21, 2009

(54) FLAT VALVE FOR ORBITAL APPLICATIONS

(76) Inventors: H. Stephen Jones, 61340 Kings Arms, Lacombe, LA (US) 70445; Walter P. Kistler, 11423 Red-Wood Rd. NE., Redmond, WA (US) 98052; Thomas C. Taylor, 3705 Canyon Ridge Arc, Las Cruces, NM (US) 88011

( * ) Notice: Subject to any disclaimer, the term of this patent is extended or adjusted under 35 U.S.C. 154(b) by 532 days.

(21) Appl. No.: 11/412,786

(22) Filed: Apr. 28, 2006

(51) Int. Cl.
*F16K 17/40* (2006.01)

(52) U.S. Cl. .................. 137/68.3; 137/318; 251/331

(58) Field of Classification Search .......... 251/331, 251/335.2; 137/68.29, 68.3, 318
See application file for complete search history.

(56) References Cited

U.S. PATENT DOCUMENTS

| | | | |
|---|---|---|---|
| 2,638,127 A | | 5/1953 | Griswold |
| 3,087,643 A | * | 4/1963 | Smirra ..................... 137/68.3 |
| 3,482,732 A | * | 12/1969 | Davis ....................... 137/68.3 |
| 3,898,863 A | | 8/1975 | Wagner |
| 3,913,604 A | * | 10/1975 | Hanson et al. ............. 137/68.3 |
| 3,938,347 A | | 2/1976 | Riedel et al. |
| 4,086,784 A | | 5/1978 | Wagner |
| 4,334,410 A | | 6/1982 | Drumare |
| 4,348,873 A | | 9/1982 | Yamauchi et al. |
| 4,592,205 A | | 6/1986 | Brodbeck et al. |
| 4,607,489 A | | 8/1986 | Krongold |
| 4,830,052 A | * | 5/1989 | Oberlin et al. ............. 137/68.3 |
| 4,873,832 A | | 10/1989 | Porter |
| 4,969,629 A | * | 11/1990 | Athanassiu ................. 251/331 |
| 5,158,263 A | * | 10/1992 | Shimizu et al. ........ 251/129.17 |
| 5,762,314 A | | 6/1998 | Williams |
| 6,202,671 B1 | | 3/2001 | Horstmann |
| 6,341,624 B1 | | 1/2002 | Nelson et al. |
| 6,431,519 B1 | | 8/2002 | Smith |
| 6,557,576 B2 | | 5/2003 | Walrath et al. |

* cited by examiner

*Primary Examiner*—John Bastianelli
(74) *Attorney, Agent, or Firm*—Fulbright & Jaworski LLP

(57) ABSTRACT

A thin diaphragm valve includes a base plate attached to a valve attach plate. A diaphragm is positioned between the plates to move between open and closed positions. A spring can be provided between the diaphragm and a sealing flange of a pipe. Because no sliding friction occurs between sealing surfaces, wear is reduced and leakage is also reduced. A pierceable membrane can also be added to provide additional security.

18 Claims, 10 Drawing Sheets

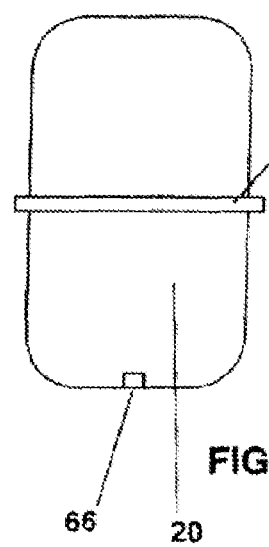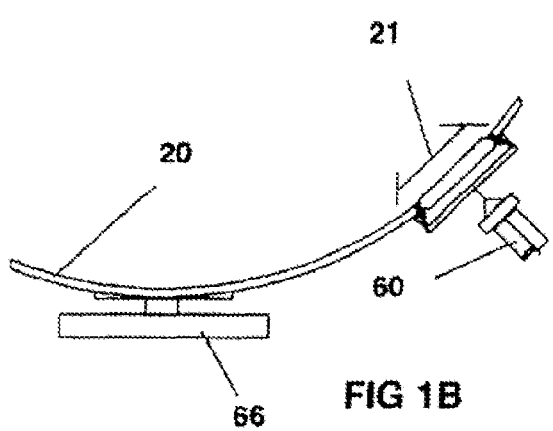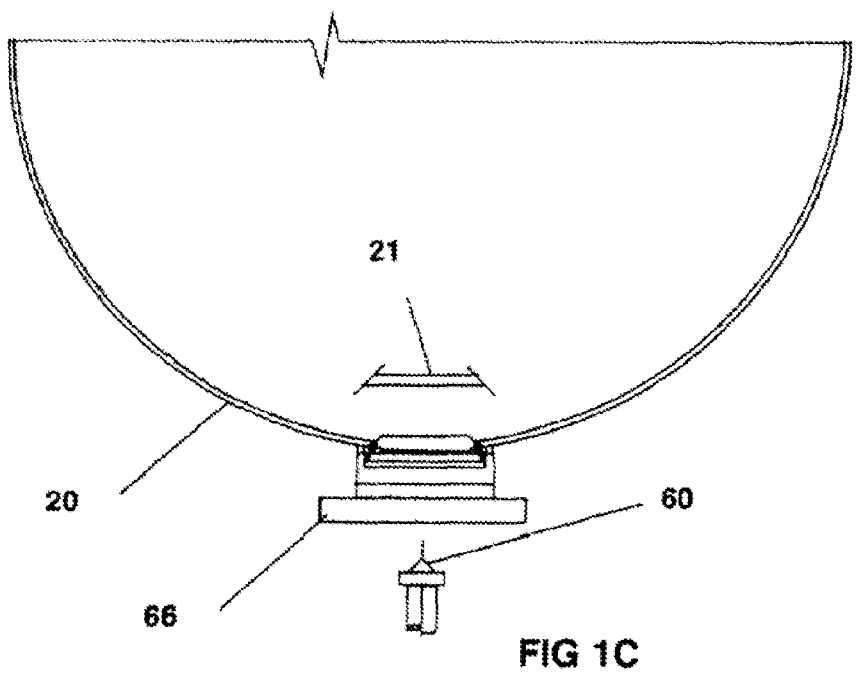

FLAT VALVE FOR ORBITAL APPLICATIONS

CROSS-REFERENCE TO RELATED DOCUMENT

The present patent application relates to Disclosure Document Number 576568 entitled "Cryogenic Valve DD #1," filed on May 2, 2005, the disclosure of which is expressly incorporated by reference herein in its entirety.

NO GOVERNMENT RIGHTS

No government funding, no government support or government contract or clause is related to this concept or patent application.

BACKGROUND OF THE INVENTION

1. Field of the Invention (Technical Field)

The present invention relates generally to aerospace. More specifically, the present invention relates to a diaphragm valve designed for thin wall tank locations. The valve controls flow of cryogen through the tank wall. One application is cryogenic propellant transfer in reusable launch vehicles.

2. Background Art

Liquids are transferred in many industries. For example, cryogenic propellants are used in aerospace. The space launch industry offers a unique set of cryogenic liquid transfer challenges and requires innovative valve hardware techniques to accomplish the safe and cost effective transfer of liquids. The valve should have reduced mass, bulk, volume, maintenance and cost.

Originally, super cooled liquids used in expendable launch vehicles (ELVs) took days to transfer from storage to the launch vehicles prior to launch from the pad. The process starts with a precooling of the receiving tank, and proceeds through difficult methods of determining the completion and methods to compensate for the boil off of the cryogenic liquid. The entire tank is filled and drained on the launch pad sometimes several times.

Liquids may also be transferred once in orbit. The traditional integrated cryogenic liquid propellant loading process in the microgravity of orbit between two large tanks is complicated by traditional valves, cryogenic tank pre-cool down requirements, and the lack of industry changing valve innovation.

The lunar transportation is expected to start from low earth orbit with the tankage being filled using expendable tanks, transported to low earth orbit in various tanks sizes to reusable space transportation vehicles in low earth orbit.

The transportation of cargo to space is expensive. Part of the problem is the high cost of the individual operations required for the transport of cargo to orbit. A new valve could reduce cost in many ways through innovation, such as using a different sealing method, using fewer valve wear surfaces, and installing the valve in the tank wall.

Since the beginning of space travel, thin wall propellant tanks have presented a problem for engineers incorporating interfaces to fill, vent, and drain the contents. The weight of propellant tanks can be optimized if the loads on it are distributed over a large region. Interface points for mounting the tank mass to a vehicle tend to distribute the loads fairly well. Interfaces for fluid piping connections tend to be point load locations on these tanks and must withstand substantial loads due to cryo shrinkage and ground systems. The moving mass of liquid has a momentum related to it and the control of the flow also results in additional loads on the tank and traditional style valves. Over the past several years, investigations into low cost cryogenic tankage for space applications have identified the need for cryogenic valves with near zero leak-rate and the capability to be packaged into the wall of propellant tanks. These valves could reduce the point loads on the tanks by becoming flatter and distributing their loads over a broader area of the tank wall. Moreover, dynamic loads caused by mounting valves on pipes or ducts that extend from the tank for the sole purpose of mounting a valve could be eliminated.

This liquid transfer control problem has been partly addressed by various minor changes in valves for centuries and patch valve improvements to the thirty-year-old facilities used to launch early expendable launch vehicles (ELV's) through the Space Shuttle. These incremental improvements are helpful, but not enough for the reusable vehicles of the future to bring down the cost of operations. Future generations of launch vehicles called the reusable launch vehicles (RLVs) are fully reusable and need robotic transfers of cryogenic liquid tanks with thin wall valves.

Cryogenic systems have been used in aerospace applications to provide propellant required to launch mass into earth orbit. Now these systems must operate without human onsite assistance beyond earth orbit to the lunar surface and beyond. Cryogenic systems have also been used advantageously in various scientific and technical applications including gas chromatography, superconductivity, magnetic resonance, and medicine. For example, in medical applications, cryogenic systems have been used for ultra rapid cooling of biological samples. In the field of gas chromatography, cryogenic focusing systems have been used to thermally trap analytes before injecting the analytes onto a column. A cryogen (such as liquid oxygen and liquid hydrogen provide maximum energy per weight unit) maintained at a low temperature is introduced for a controlled period of time to cool a cryogenic trap.

In the past, motor actuated valves (e.g., U.S. Pat. No. 3,898,863), float type valves (e.g., U.S. Pat. Nos. 4,873,832, 4,592,205 and 4,607,489), and solenoid valves (e.g., U.S. Pat. No. 4,348,873) have been used in cryogenic applications. In aerospace applications the absence of valve stems, maintenance, robotic operation and the elimination of piping are important.

Certain types of diaphragm valves also have been used for cryogenic liquids and other liquids (e.g., U.S. Pat. Nos. 2,638,127 and 4,086,784). However, these have been used as pressure modulated valves, where the valve is opened on the pressure of the cryogen.

Generally, solenoid valves are rated at approximately one million cycles and are subject to failure when operated substantially beyond one million cycles. Failures primarily are related to the effects of low temperature (i.e., −196 degrees C. for liquid nitrogen). Solenoid valves are also subject to leakage, slow response, lack of reliability at low temperatures and/or low flow rates, and wear of contacting surfaces. Solenoid valves tend to stick when operating at low temperatures. Solenoid valves also have not been capable of opening and closing at a sufficiently high frequency which is necessary to achieve a high degree of control of liquid nitrogen flow.

For solenoid valves in aerospace applications beyond earth's gravity, a number of otherwise suitable materials become brittle at low temperature. Materials must perform satisfactorily over the complete range from cryogenic to room temperature in a variety of gravity situations. Stresses due to thermal contraction, and radial, axial and circumferential temperature gradients caused by non-uniform cooling rates are frequently encountered in the cool-down of cryogenic transfer lines and valves associated therewith. For example, seals at the center of the plunger in the valve harden at low temperature, resulting in leakage and/or blow-by across the solenoid valve.

To improve the reliability and effectiveness of solenoid valves in aerospace, attempts have been made to reduce critical tolerances, use more advanced materials, and use redundant parts for sealing, such as multiple O-rings. However, such designs are prohibitively expensive for many applications.

In the past, solenoid valves capable of handling high pressures (i.e., above approximately 100 psi) have been limited to low flow rates. Aerospace needs relatively low pressures compared to other industrial applications and higher flow rates. Typically, a solenoid operated cryogenic valve operates against a pressure/area differential, and the electromagnet is therefore a limiting factor on pressure. Moreover, solenoid valves used in cryogenic applications have slow response times due at least in part to increased electric current requirements at low temperatures.

Examples of cryogenic liquid transfer from other industries include the optical coating industry and methane tank service industry. U.S. Pat. No. 3,938,347 to Riedel, et al., assigned to Optical Coating Lab, entitled "Level Control Apparatus and Method for Cryogenic Liquids" discloses cryogenic tanks, with level sensing means in the form of thermocouples and resistors inside the tank.

Cryogenic liquid filling and ullage in the methane industry is typically accomplished by placing instrumentation in the tank. For example, U.S. Pat. No. 4,334,410 to Drumare, entitled "Tank Designed to Contain a Liquefied Gas" discloses a system that uses methane tanks, which work at minus 160 degrees C. and typically get 98% full or 2% ullage. In filling methane tanks the heat responding device and the temperature responding element are placed inside the tank and are a source of extra expense. Each element of complexity is a source of failure.

Typically, the ground operations with cryogenic valves include the handling, monitoring, control and effective use of all the liquids required for the transportation cycle to orbit. The total cost of the transportation cycle is in part the result of the ground operations. The cost-effective transfer of vehicle propellants at the ground facility could be enhanced by an improved diaphragm valve, and the efficient use of the reusable vehicle and its propellants.

New valve technology is therefore needed to overcome the problems described above.

SUMMARY OF INVENTION

An aspect of the present invention controls liquid flow without valve stems, without volume constraints protruding from the tank and by telerobotic methods to control the shutoff of the liquid near the cryogenic tank. The present invention solves a number of the previously mentioned problems.

It is an objective of the present invention to provide a relatively low cost thin wall valve for cryogenic applications that is not subject to leakage or other failure after long-term use.

Another objective of the present invention is to provide a relatively low cost valve for cryogenic applications using innovation without solenoid operated cryogenic valve techniques that is capable of operating at pressures below 100 psi without reducing the flow rate below what aerospace finds useful.

Another objective of the present invention is to provide an inexpensive cryogenic valve with an improved response time throughout the temperature range of liquid cryogen.

It is another objective of the present invention to provide a low cost valve for use in cryogenic systems that is durable for use in excess of fifty million cycles without failure.

A still further object of the present invention is to provide a valve for cryogenic applications that operates with minimal leakage at low temperatures during extended usage.

Yet another object of the present invention is to improve liquid loading in either direction in order to accomplish the transfer with a minimum of time and delay and with maximum safety.

In one embodiment, a flat valve includes a base plate having flow holes. The valve also includes an attach plate connected to the base plate, the attach plate having a central aperture. The valve further includes a pipe and a diaphragm. The pipe fits within the central aperture, and it includes a sealing flange at one end, the sealing flange located between the base plate and the attach plate. The diaphragm is positioned between the sealing flange and the base plate so that the sealing flange presses against the diaphragm to close the flat valve. The diaphragm has an aperture that communicates with a passage within the pipe.

A spring may be provided between the sealing flange and the diaphragm. A first seal can be provided between the sealing flange and the attach plate. A secondary seal can be provided between a cylindrical portion of the pipe and the attach plate. In one embodiment, bolts fasten the base plate to the attach plate. A security shield can cover the flat valve.

An actuator can exert force against the sealing flange to close the flat valve. The force can be a mechanical force, a pneumatic force, a hydraulic force, and/or a magnetic force.

In one aspect, the base plate has first sealing surfaces that contact the diaphragm when the valve is closed. The diaphragm has second sealing surfaces that contact the first sealing surfaces when the valve is closed. The first sealing surfaces and the second sealing surfaces can be coated with a high strength material. The valve opens and closes without sliding motion between sealing surfaces. The second sealing surfaces deform into the first sealing surfaces.

In yet another embodiment, a pierceable membrane can be attached to the base plate. A penetrator can also be provided. The penetrator pierces the pierceable membrane and includes a penetrator pipe and a penetrator tip. A check valve can transfer gas leaking in the penetrator pipe to a storage.

In still another embodiment, a flat valve has a base plate including flow holes, and an attach plate connected to the base plate. The attach plate has a central aperture. The valve also includes a pipe and a diaphragm. The pipe has a sealing flange at one end. The sealing flange is located between the base plate and the attach plate. The pipe fits within the attach plate central aperture. The diaphragm is positioned between the sealing flange and the base plate so that the sealing flange presses against the diaphragm to close the flat valve. The valve also includes a pierceable membrane attached to the base plate, and a penetrating system that includes penetrator blades that pierce the pierceable membrane.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating preferred embodiments of the invention and are not to be construed as limiting the invention. In the drawings:

FIG. 1A shows a typical tank for liquid transfer in many industries;

FIG. 1B shows a flat diaphragm valve attached to a spherical tank wall, according to an aspect of the present invention;

FIG. 1C show the flat diaphragm valve attached to a longitudinal axis of a spherical tank wall, according to an aspect of the present invention;

DETAILED DESCRIPTION

Figure 2:
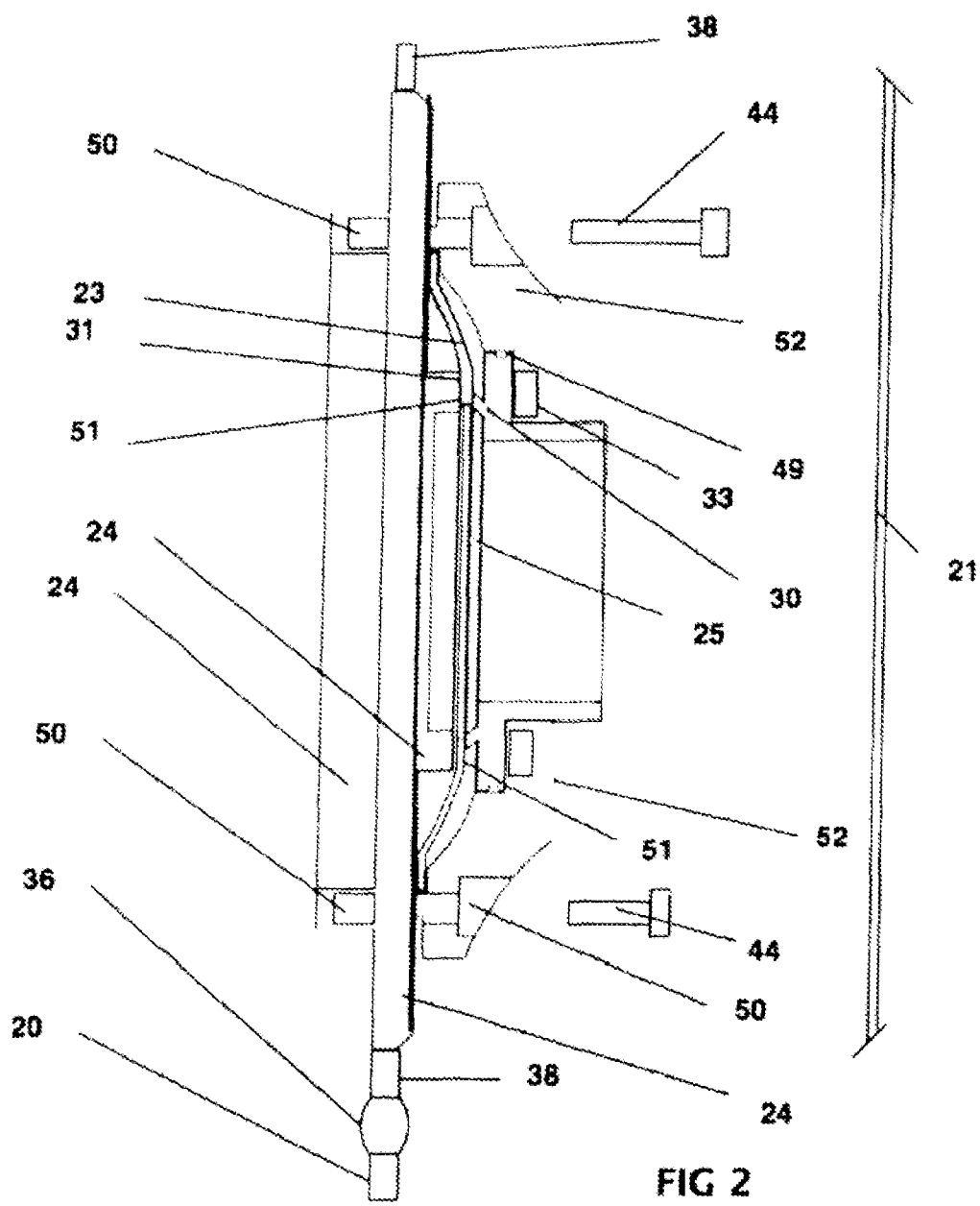
FIG. 2 is a section view of a flat diaphragm valve for liquid transfer in a closed position, according to an aspect of the present invention.
Figure 3:
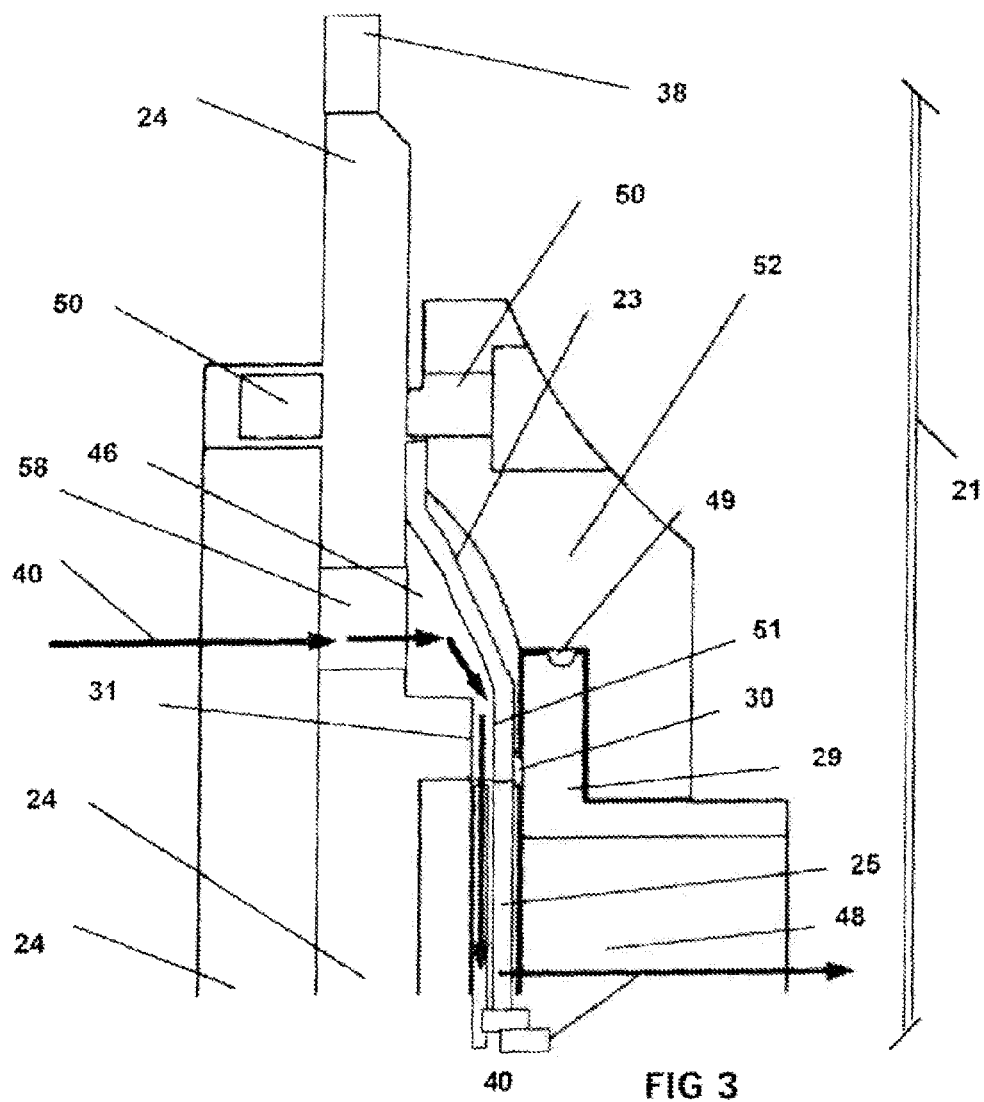
FIG. 3 is a section view of a flat diaphragm valve for liquid transfer in an open position, according to an aspect of the present invention.

A flat membrane valve system in an aspect of the present invention is directed to enhancing liquid control and transfer technology and its use in various industries, including cryogenic launch vehicle propellant technologies. The present innovation provides a more cost-effective tank system and vehicle configuration. Although liquid is generally discussed as the tank contents, it is understood that gas could also be contained within the tank and controlled by uses of the valve of the present invention.

The valve technology of the present invention has applicability in many industries. Such a valve is useful in industrial, scientific and analytical applications including oil field, space launch site propellant loading, gas chromatography, superconductivity, magnetic resonance, and medicine. For example, in addition to the cryogenic performance discussed below, the technology is ideal for sealing mobile tanks of toxic or corrosive chemicals. A number of other industries use cryogenic liquid valves and require transfer, pre-cooling and control valve systems for the liquid utilization. For example, methane tank liquefied gas filling uses systems that would benefit from the present invention, as would optical coating industry cryogenic systems. The following discussion focuses primarily on the cryogenic application of the technology. However, the present invention is useful for liquid filling and ullage in other industries. Application to other industrial uses is therefore within the scope of the present invention.

Typically, liquid nitrogen or other cryogen is stored in a pressurized tank at pressures of zero to 300 psi. An exemplary tank 20 is shown in FIG. 1A. The tank 20 can be spherical and can be used in aerospace applications in the vacuum of low earth orbit. The tank 20 requires filling to compensate for boil off of cryogenic liquid, recycling and sometimes draining on the launch pad. The tank 20 may include robotic handling hardware 66 at the tank's top and bottom. In one embodiment, the tank wall is approximately ⅛" thick.

A thin wall valve 21 (also referred to as a diaphragm valve 21) can be placed in the tank wall, as shown in FIG. 1B. The valve 21 can be appropriately located on curved tanks having complex curves and flat portions as well as located at the traditional pipe locations. The thin wall valve 21 eliminates the insulated transfer lines from the pressurized tank that are typically required. FIG. 1C shows the tank 20 (spherical or more complex in design) with the diaphragm valve 21 installed in the spherical end portion near a stronger location of the tank 20, such as near the robotic handling hardware 66. The valve 21 can be constructed of stainless steel, carbon steel, polymer, brass, copper, beryllium, composite, carbon fiber, and ductile material that yields in compression. Ceramic, as well as other materials are also contemplated.

In one embodiment, the valve 21 is protected with a cover plate during transportation, further enhancing security. In another embodiment, in the vacuum of space the cryogenic liquid can be accessed using a penetrator tip 60 (discussed in detail below).

The valve 21 can be fabricated as a panel that attaches to vessels or containers. It can be fabricated as a separate assembly or integral with the container. The valve 21 works equally well for containers with planar, cylindrical and compound surfaces. The valve can be welded, brazed, bolted, or joined to the vessel in any manner that provides sealing and acceptable leak rates. Welding is described in an embodiment below.

The valve 21 in the tank wall controls the flow of cryogen to the rocket motor or apparatus consuming the cryogen liquid or gas. A relatively high degree of robotic control of the valve 21 is important, even if the valve 21 remains dormant during periods of launching and storage. It is desirable that the valve 21 be sufficiently durable to hold up for 20 to 50 million cycles.

Referring to FIGS. 2-9, the valve 21 essentially includes a base plate 24 attached to a valve attach plate 52. In one embodiment, the attachment is via bolts 44 received within bolt holes 50. Between the plates 24, 52 are a flexible diaphragm/membrane 23 and a portion of a pipe 48, which operates as an inlet/outlet for the liquid. The diaphragm 23 is sandwiched between the two plates 24, 52 in a configuration permitting fabrication in a thin wall tank 20.

The pipe 48 includes a central passage that is aligned with a central aperture of the diaphragm 25 to permit liquid flow when the valve 21 is in the open position. Flow holes 58 are also provided in the base plate 24 to permit liquid flow when the valve 21 is in the open position. In a preferred embodiment, the flow holes 58 are sized so that they do not limit the flow. The diameter of the flow holes 58 may be varied if desired. Arrows 40 show an exemplary flow path.

The pipe 48 has a sealing flange 29 at one end that is held between the plates 24, 52. A spring 30, such as a disk spring, can be interposed between the diaphragm 23 and the sealing flange 29 to pressure the diaphragm 23 into the closed position. Exemplary springs include a Bellville spring, a finger spring, a coil spring, a linear spring, a progressive spring, and any other approach to providing mechanical spring force. A seal 49 (such as an O-ring) can circumscribe the sealing flange 29 to help prevent liquid from flowing between the sealing flange 29 and the valve attach plate 52 when the valve is in the open position. A secondary seal 53 can circumscribe the pipe and provide a seal between the pipe exterior and the valve attach plate 52 to further prevent leaks.

The base plate 24 can be welded into the metal tank wall 20 using a weld land 38 and a weld 36. As seen more clearly in FIG. 6, the base plate includes flow holes 58 through which liquid flows when the valve 21 is in the open position. The base plate 24 and the valve attach plate 52 both have integral bolt holes 50 that receive bolts 44 to hold the plates 24, 52 together.

The base plate 24 also includes extensions that end with sealing surfaces 31. The sealing surfaces 31 contact sealing surfaces 51 of the diaphragm 23 when the valve 21 is in the closed position. When the valve 21 is open, liquid flows between the sealing surfaces 31, 51.

The sealing surfaces 31, 51, as well as a portion 28 of the spring that contacts the diaphragm 23, benefit from high machining tolerances, e.g., tolerances of +/−0.00001 inches. The actual contact surfaces 31, 51, and spring contact portions 28 are small and can be coated with a high strength material using such technologies as chemical vapor deposition, electroforming and electropolishing. In one embodiment, the contact surfaces 31, 51, 28 are aluminum and the membrane 23 is stainless steel. Advantages of the hardened seats 31 include forcing the membrane 23 to conform to a surface for sealing.

Exemplary coatings include oxide coatings for aluminum surfaces, and titanium oxide coatings for steel surfaces. Flame sprayed coatings can increase hardness. The state of the art for application of coatings includes plated, electroless application, vapor deposition of all types, flame sprayed, and other techniques for applying materials with a bond at the molecular level, These coatings, as well as other coatings that modify the surface for hardness, smoothness, abrasion resistance, and chemical resistance are considered to be within the scope of the present invention. As a result of the precision manufacturing, a mechanical interface is generated with no voids or imperfections in the mating surfaces.

In one embodiment, filters are provided at inlets and outlets to protect the sealing surfaces 31, 51 from damage when closing due to large particles within the liquid flowing through the valve.

An actuating mechanism 33 controls movement of the diaphragm 23 by pressing the pipe 48 and its sealing flange 29 towards the diaphragm 23. Thus, a surface of the sealing flange 29 presses against the spring 30, which presses against the diaphragm 23 to close the valve 21. Because the valve 21 contains no sliding motion with parts bearing on one another, wear is significantly reduced. Moreover, there will be minimum plastic deformation of the sealing surfaces 31, 51.

The sealing flange 29 can be moved axially, eccentrically, or rotary. Valve operation controls pressure against one face of the diaphragm 23 so that the diaphragm 23 moves between open (FIG. 2) and closed (FIG. 3) positions based on the pressure differential between the opposing faces and a force, such as a rotational force of an actuator 33. The actuator loads can be isolated to the valve 21 so that external loads are not applied to the thin wall tank 20 when actuating the valve 21 open or closed.

The diaphragm 23 is controlled by one or more actuators 33 including a mechanical mechanism, a magnetic mechanism, a pneumatic mechanism, and/or a hydraulic mechanism. The control can be remote control, such as via tele-robotic rotation, and can include safety systems. In one embodiment, the valve 21 can be controlled, engaged and terminated robotically from a distance in space via telecommunications and also used in earth surface applications. Upon the command for launch, the ground interface to these valves is severed using pyrotechnic components and frangible links that ensure zero leak rates.

In one embodiment, the actuator 33 is separate from the valve 21 and "keyed" to the valve 21 such that the valve 21 can be only be opened and closed at locations where it is safe and appropriate. This embodiment is advantageous when operating with extremely dangerous fluids, such as chemical agents, and radioactive waste, as well as when operating with precious fluids. For example, without the actuator mechanism 33 being present with the valve 21, the valve could not be opened, such as when the valve is in transit. In this example, the actuator 33 is only provided at fill and drain points. In this embodiment, the valve 21 (and optional access plate) provide better protection than the tank itself.

A preferred material for the diaphragm valve 21 is metal when the skin of the tank 20 is also metal. A ceramic diaphragm valve 21 and valve seats are suitable when the tank contains substances that are not compatible with any known metallic materials. A polymer or any other non-brittle material is also contemplated for applications where tank security and lower cost are desired. The diaphragm valve 21 is surface normal flexible and withstands at least 50 million cycles at low temperatures, such as that of liquid nitrogen, and is rated to liquid helium temperatures.

Because there is no sliding contact, the membrane 23 is plastically deformed into the sealing surface 31 under compression to provide sealing contact. In other words, the membrane 23 conforms to microscopic voids and irregularities to eliminate flow paths. The material of the membrane 23 yields (without failing) to conform to the mating surfaces under compression on the first compression (preferably during the manufacturing process). As noted above, the material yields to evenly distribute the clamping force.

The membrane 23 could be plastic, carbon fiber, or metal with a sandwiched composite for high strength. Flexible membrane actuating sealing diaphragm 23 preferably is constructed from a cryogen compatible material and is flexible enough to seal against the other surfaces within the thin wall valve hardware surfaces. In one embodiment, the diaphragm 23 is made of a polyimide film commercially called Kapton® polyimide film, which is commercially available from DuPont High Performance Materials. Polyimide film is preferred over a metal diaphragm 23, for certain applications where lower pressures allow lower cost materials. For most applications, the polymers would be much thicker, for example, 0.1" or thicker. In one example, a metal diaphragm 23 could be as thin as 0.050". Because metals are the strongest, metal construction would typically allow the thinnest membranes. Plastics may be preferable for systems where metallic ions can contaminate the fluid, as in the semiconductor industry.

Various thicknesses of Kapton® polyimide film may be used, with a preferred thickness in the range from 0.003 inch to 0.005 inch. Kapton® polyimide film having a thickness of between 0.001 and 0.005 inches was tested. Thicknesses of 0.003" through 0.005" have been tested in excess of 1 million cycles without leakage or other failure. The 0.005 inch thickness is most preferred because of an increased safety factor. If the diaphragm is required to be a non-yielding material, a yielding washer could be provided between the hardened surfaces.

The diaphragm valve 21 is pressure responsive to open and close upon a pressure differential between opposing sides of the diaphragm 23. An advantage of the valve 21 is that force applied to the mating surfaces 31, 51 can have a high sealing pressure margin because of the sealing process of the present invention. The clamping forces can exceed the operating pressure by several orders of magnitude. If, however, only a low sealing pressure margin is required, then the user of elastomeric or polymeric membranes is possible.

Figure 4:
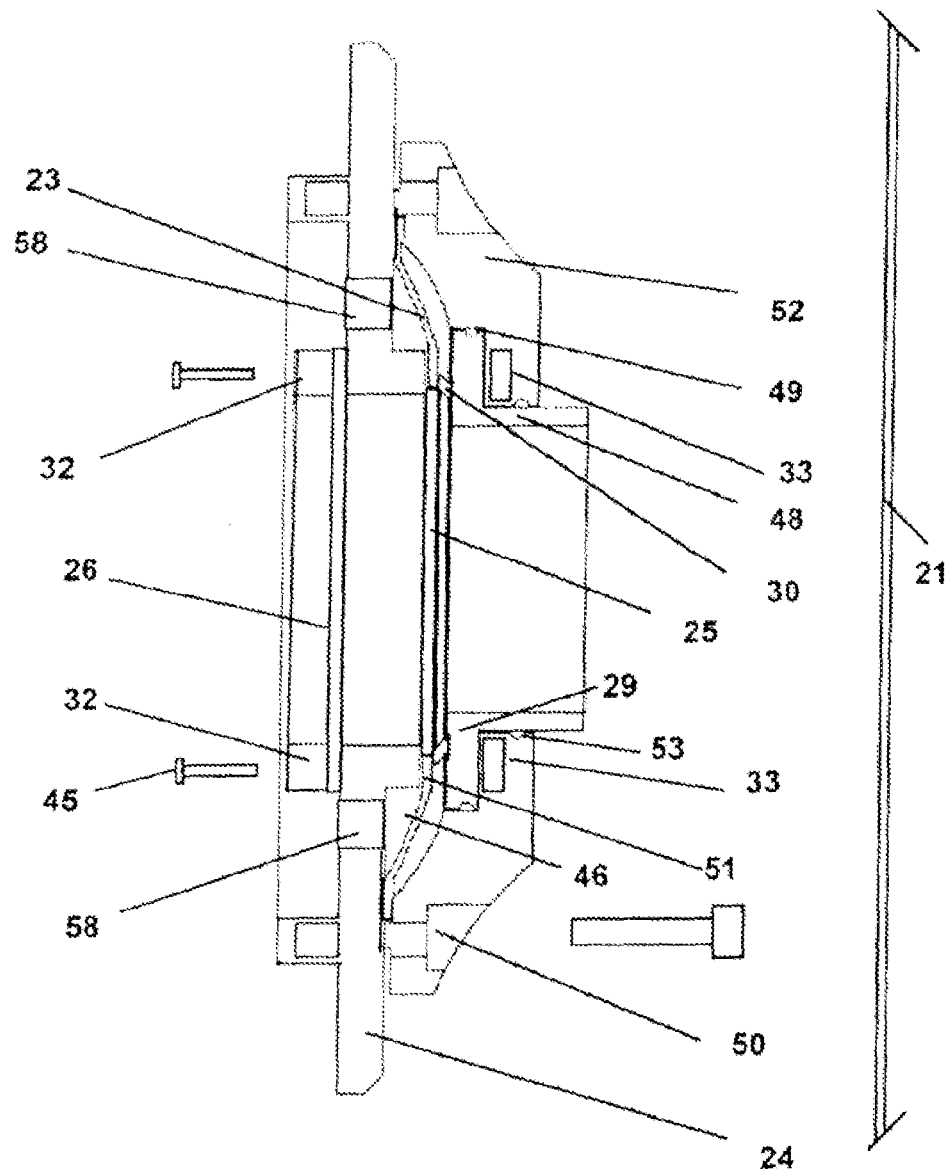
FIG. 4 is a section view of an open flat diaphragm valve for liquid transfer with a pierceable membrane, according to an aspect of the present invention.
Figure 5:
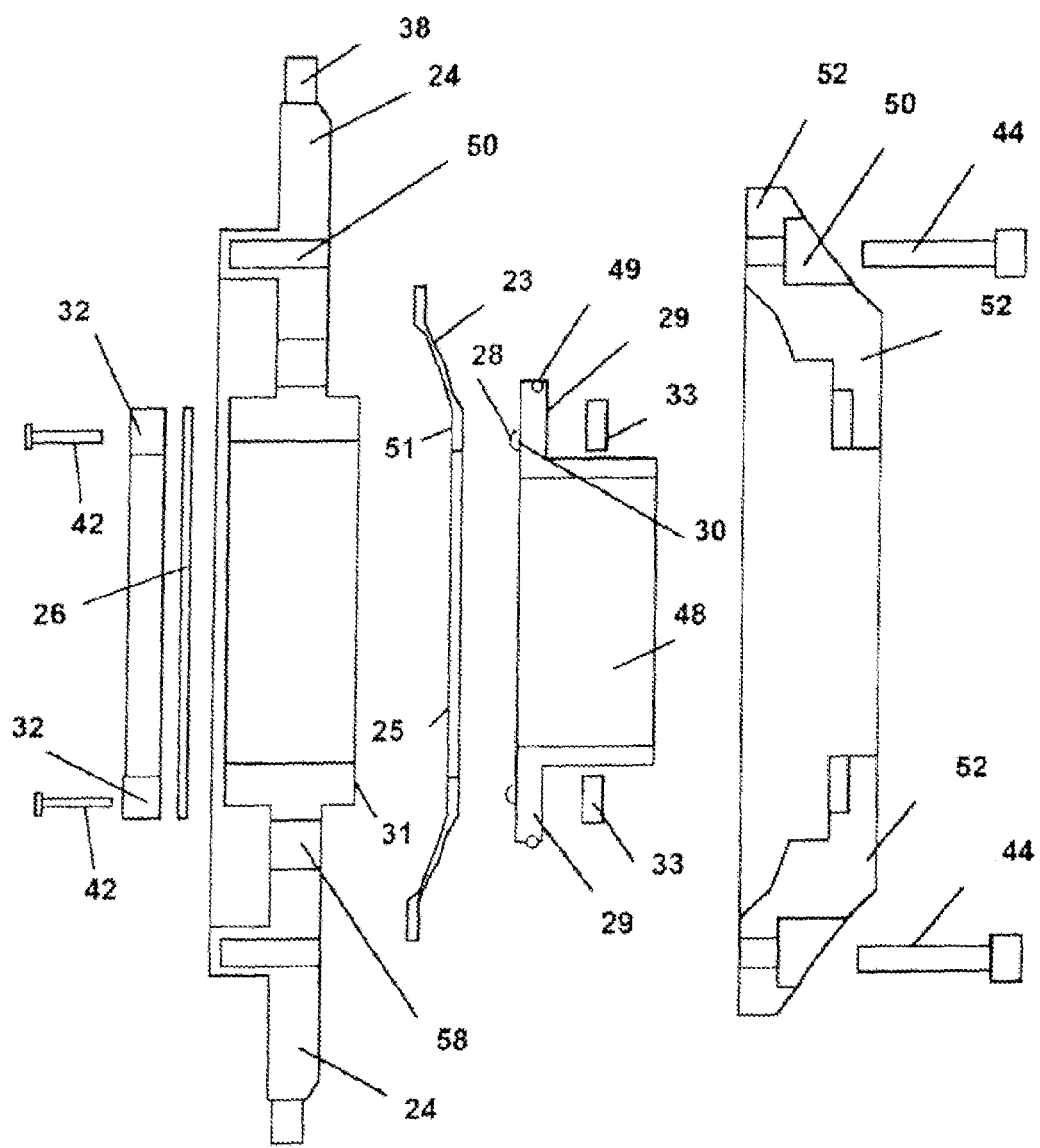
FIG. 5 is an expanded view of the flat diaphragm valve, according to an aspect of the present invention.
Figure 6:
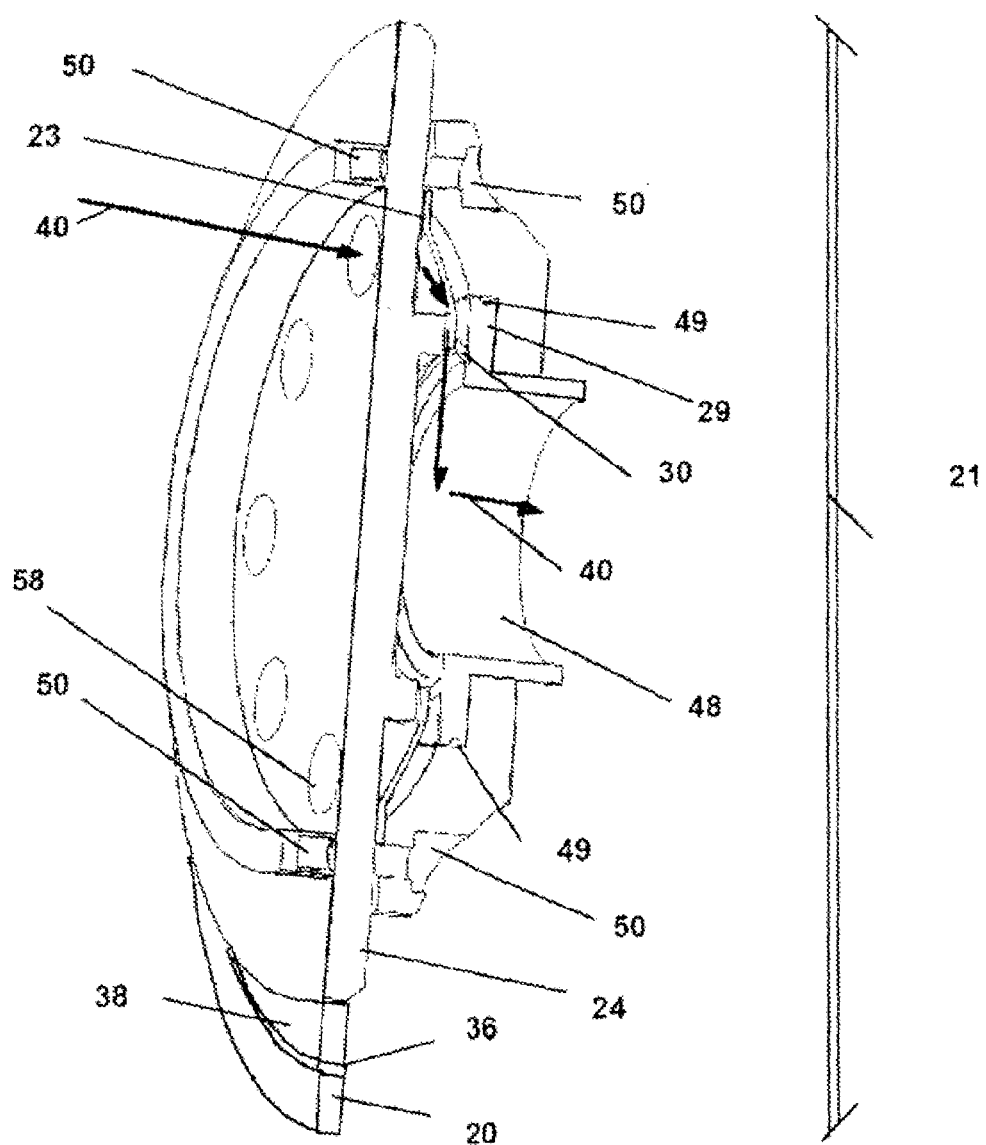
FIG. 6 is a cut perspective view of the flat diaphragm valve, according to an aspect of the present invention.
Figure 7:
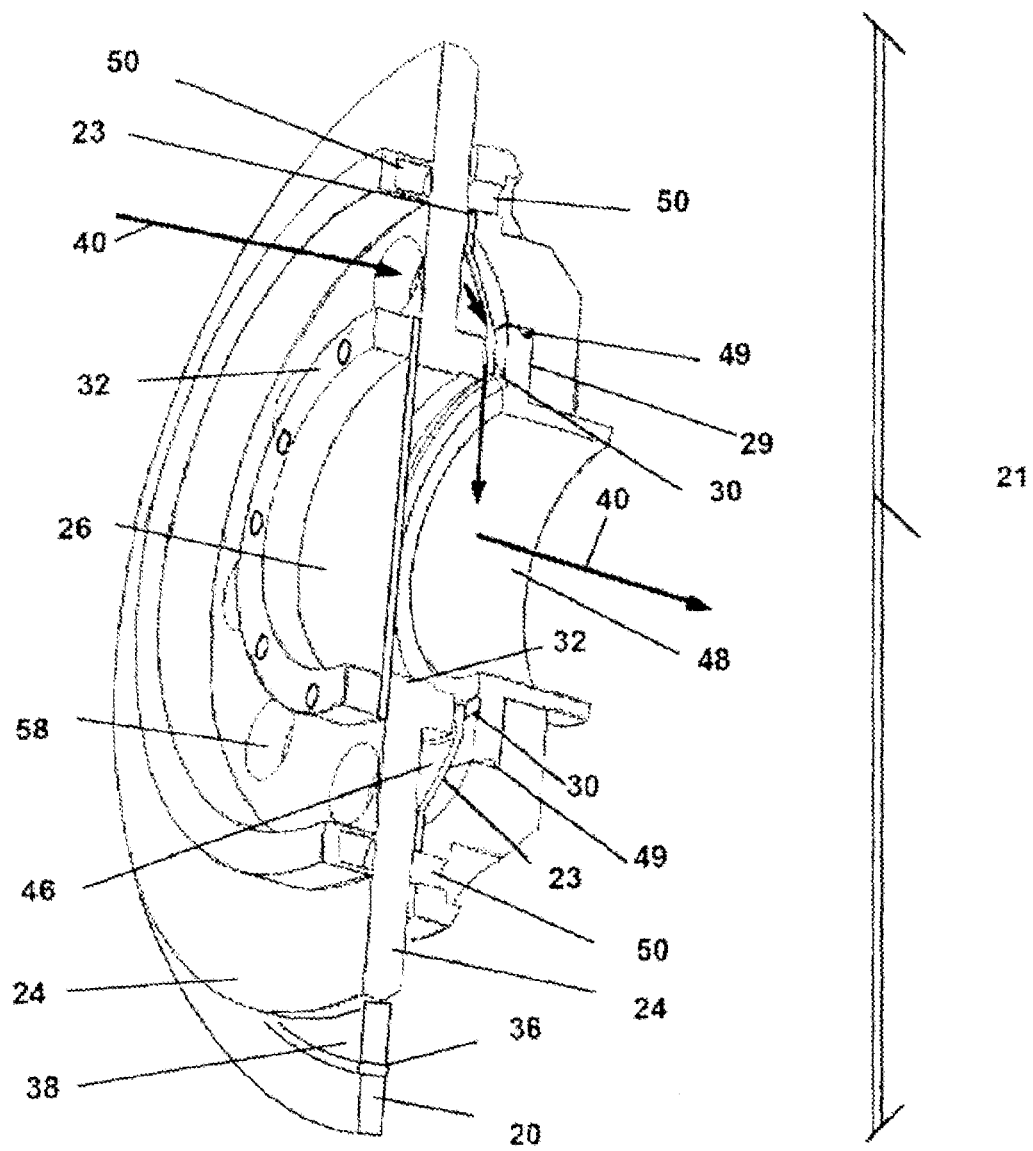
FIG. 7 is a cut perspective view of the flat diaphragm valve with a pierceable membrane, according to an aspect of the present invention.
Figure 8:
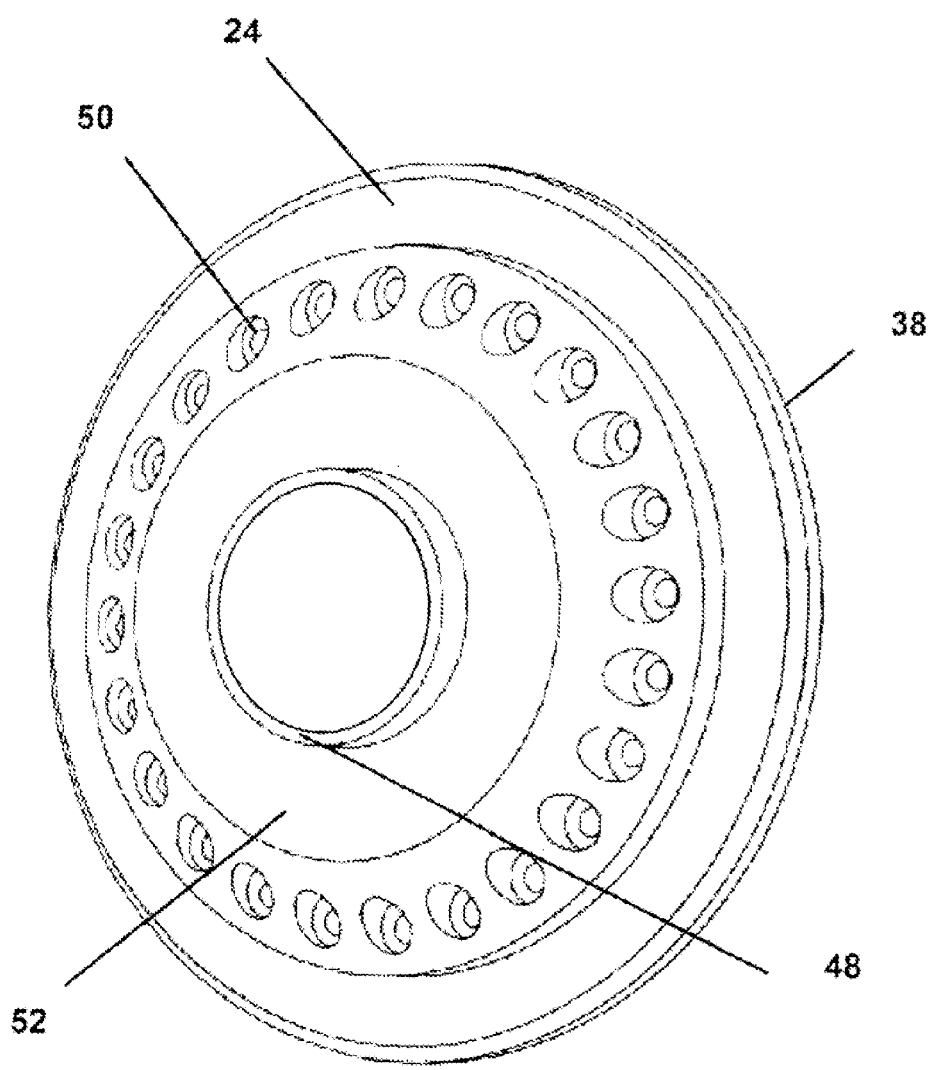
FIG. 8 is an assembled view of the flat diaphragm valve, according to an aspect of the present invention.

FIG. 4 is a section view of an open flat diaphragm valve for liquid transfer with a pierceable membrane 26. The pierceable membrane concept for disposable tanks can be easily integrated with outstanding packaging and system reliability. The pierceable membrane 26 provides additional sealing aspects of the valve holding the liquid in the tank. The pierceable membrane 26 can be held in place, for example, by a ring 32 bolted to the base plate 24 with bolts 42. The tank 20 can be sealed with the membrane 26 until use in orbit or the final use location. The pierceable membrane 26 is available for only a single use. However, the valve 21 can be used after the membrane 26 has been pierced, to permit further use of the tank contents. Although a single membrane 26 has been described, multiple membranes could be used for redundancy.

Figure 9:
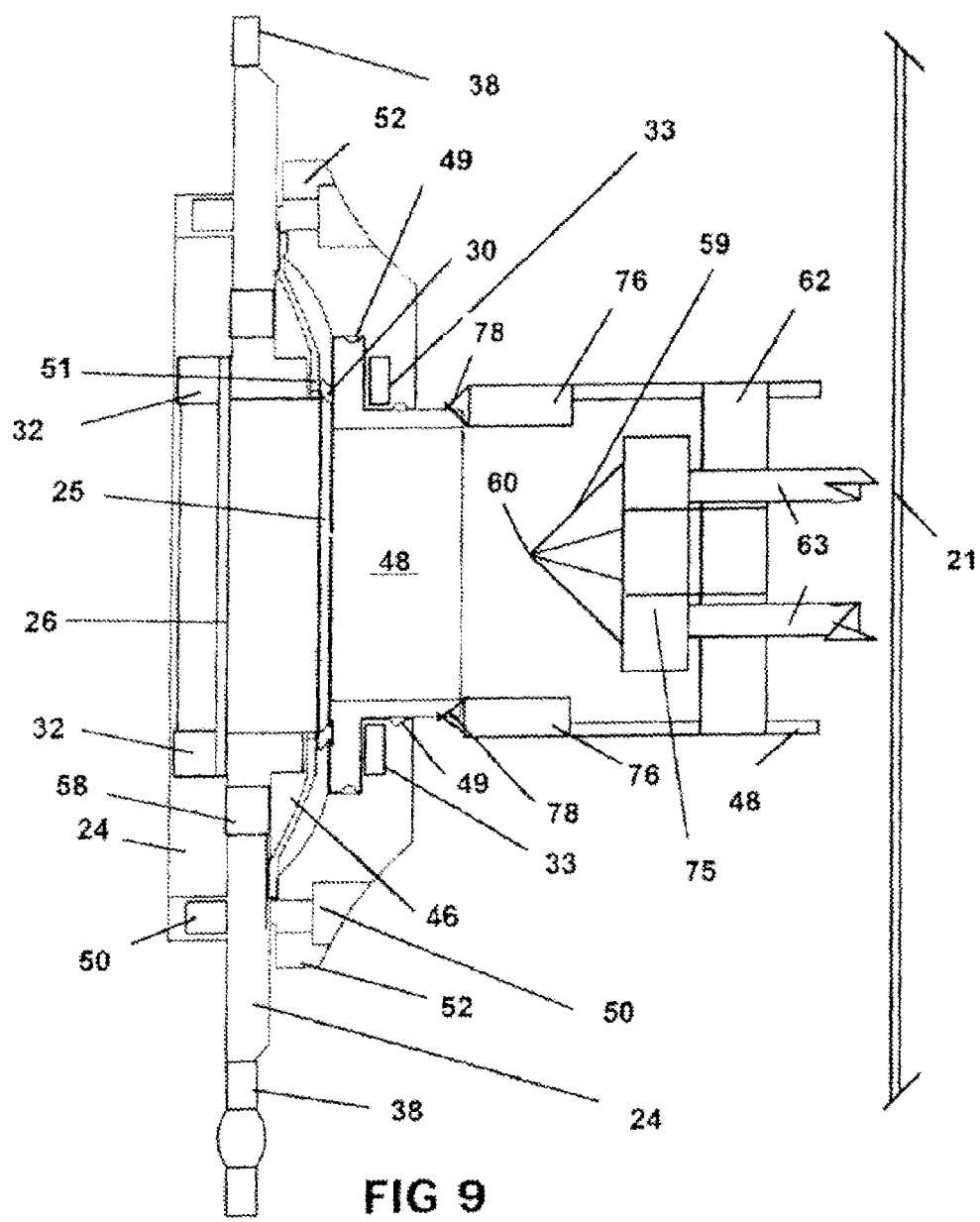
FIG. 9 is a section view of a piercing membrane with penetrator of the flat diaphragm valve, according to an aspect of the present invention.
Figure 10A:
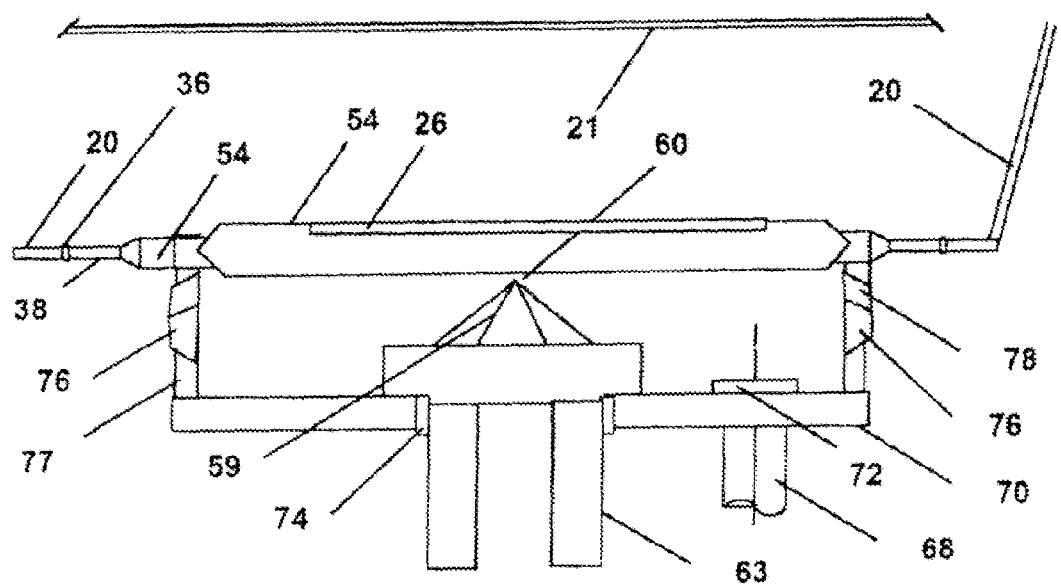
FIG. 10A is a section view of the flat diaphragm valve with a gas recovery system, according to an aspect of the present invention.
Figure 10B:
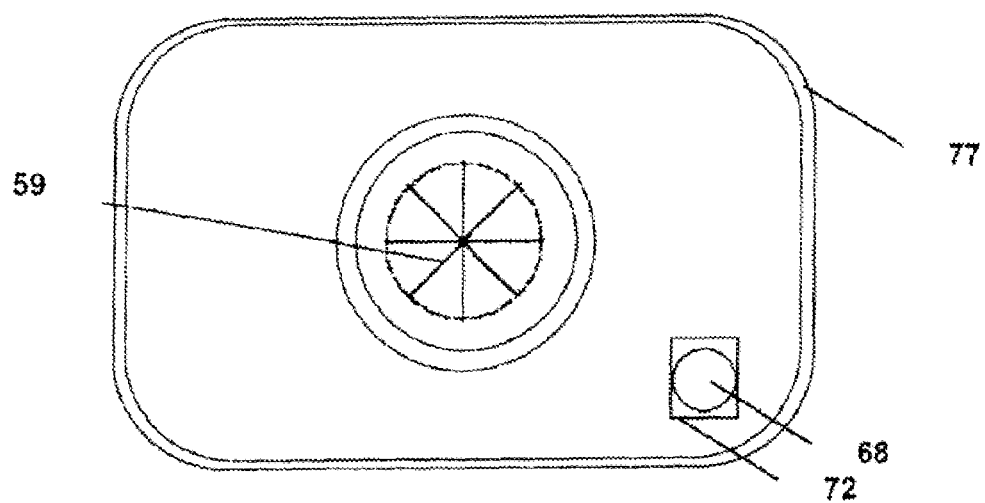
FIG. 10B is a plan view of the flat diaphragm valve with the gas recovery system, according to an aspect of the present invention.

FIG. 9 is a section view of the flat valve 21 including the piercing membrane 26 and a penetrator 75. FIG. 10A is a section view of the flat diaphragm valve 21 with a pierceable membrane 26 and FIG. 10B is a plan view of the flat diaphragm valve 21 recovering gaseous propellant when loading liquid oxygen (LOX) propellant, for example in the vacuum of space.

As discussed above, the tank 20 can be sealed with a membrane 26 until use in orbit or at the final use location. A penetrator system can be attached to the pipe 48 for piercing the pierceable membrane 26. In one embodiment, the penetrator system is remotely operated. The penetrator system includes a penetrator pipe 47 that is connected to the pipe 48 via a mating ring 76. The mating ring 76 helps contain any gaseous propellant leaked when the pierceable membrane 26 has been opened. A metal seal 78 seals the pipe 48 and the mating ring 76 to accomplish a tighter seal.

In order to pierce the membrane 26, a penetrator tip 60 of penetrator blades 59 supported by a penetrator body 75 swings towards the pierceable membrane 26 to contact it. Guides 63 ensure the penetrator tip 60 moves in the proper direction. Once pierced, liquid flows into the pipe 48 and then the penetrator pipe 47 for liquid transfer. The liquid eventually flows through a passage 61 within a penetrator support 62. The liquid can pass through a hollow portion within the penetrator body 75 or can flow around the penetrator body 75 to access the passage 61. Additional seals 74 can be provided to prevent leaking near the guides 63.

Some gas associated with the propellant flowing through the pipe 48 to the final use point may leak into the penetrator pipe 47. Any leaks are transferred in a gaseous form via a gaseous back flow check valve 72 through gaseous liquid collection line 68 to a tank for later use.

The thin valve technology lends itself to cryogenic robotic operations in space, eliminates a valve stem, and reduces leakage. The thin valve 21 is appropriate at the ground facility in one type of gravity as well as in robotic microgravity operations in space. That is, the thin wall valve 21 and tank 20 permit the tank 20 to be filled on earth, transported to orbit and used as a disposable tank. Later the tank 20 can be a reusable tank with use of the thin wall valve 21. In one embodiment, the valve 21 can be protected with a cover plate (not shown) during transportation, further enhancing security. The cover can prevent tampering with the valve 21 and can also provide redundant sealing.

Advantages of the present invention include being able to maintain any leak rate established during manufacturing and quality acceptance. That is, no sliding friction (wear causing motion) or soft polymeric/fibrous packing materials are used, so the leak rate of the valve will not change over its life. Moreover, the valve cycle life is based on the life of the springs, which, for Bellville springs, is known to exceed many millions of cycles before failure or leakage.

Other advantages include the ability to handle all types of fluids, flow in both directions and the ability to operate across a very wide temperature range. In one embodiment, the temperature range is between 0K and 900K.

Although the invention has been described in detail with particular reference to these preferred embodiments, other embodiments can achieve the same results. Variations and modifications will be obvious to those skilled in the art and it is intended to cover in the appended claims all such modifications and equivalents. For example, a wiper can be added to clean the surface as it seats. Moreover, the open area can be throttled to therefore mass the flow rate. The entire disclosures of all references, applications, patents, and publications cited above are hereby incorporated by reference herein in their entireties.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed:

1. A flat valve comprising:
   a base plate including flow holes;
   an attach plate connected to the base plate, the attach plate having a central aperture;
   a pipe including a sealing flange at one end, the sealing flange located between the base plate and the attach plate, the pipe fitting within the attach plate central aperture;
   a diaphragm positioned between the sealing flange and the base plate so that the sealing flange presses against the diaphragm to close the flat valve, the diaphragm having an aperture that communicates with a passage within the pipe;
   a pierceable membrane attached to the base plate; and
   a penetrator that pierces the pierceable membrane, the penetrator comprising a penetrator pipe and a penetrator tip.

2. The flat valve of claim 1, further comprising a spring provided between the sealing flange and the diaphragm.

3. The flat valve of claim 1, further comprising a first seal provided between the sealing flange and the attach plate.

4. The flat valve of claim 3, further comprising a secondary seal provided between a cylindrical portion of the pipe and the attach plate.

5. The flat valve of claim 1, further comprising bolts that fasten the base plate to the attach plate.

6. The flat valve of claim 1, further comprising an actuator that exerts force against the sealing flange to close the flat valve.

7. The flat valve of claim 6, in which the force comprises a mechanical force.

8. The flat valve of claim 6, in which the force comprises a pneumatic force.

9. The flat valve of claim 6, in which the force comprises a hydraulic force.

10. The flat valve of claim 6, in which the force comprises a magnetic force.

11. The flat valve of claim 1, in which the base plate further comprises first sealing surfaces that contact the diaphragm when the valve is closed.

12. The flat valve of claim 11, in which the diaphragm further comprises second sealing surfaces that contact the first sealing surfaces when the valve is closed.

13. The flat valve of claim 12, in which the first sealing surfaces and the second sealing surfaces are coated with a high strength material.

14. The flat valve of claim 12, wherein the valve opens and closes without sliding motion between sealing surfaces.

15. The flat valve of claim 12, in which the second sealing surfaces deform into the first sealing surfaces.

16. The flat valve of claim 1, further comprising a check valve that transfers gas leaking in the penetrator pipe to a storage.

17. The flat valve of claim 1, further comprising a security shield that covers the flat valve.

18. A flat valve comprising:
- a base plate including flow holes;
- an attach plate connected to the base plate, the attach plate having a central aperture;
- a pipe including a sealing flange at one end, the sealing flange located between the base plate and the attach plate, the pipe fitting within the attach plate central aperture;
- a diaphragm positioned between the sealing flange and the base plate so that the sealing flange presses against the diaphragm to close the flat valve;
- a pierceable membrane attached to the base plate; and
- a penetrating system comprising penetrator blades that pierce the pierceable membrane.

* * * * *